Figure 1:
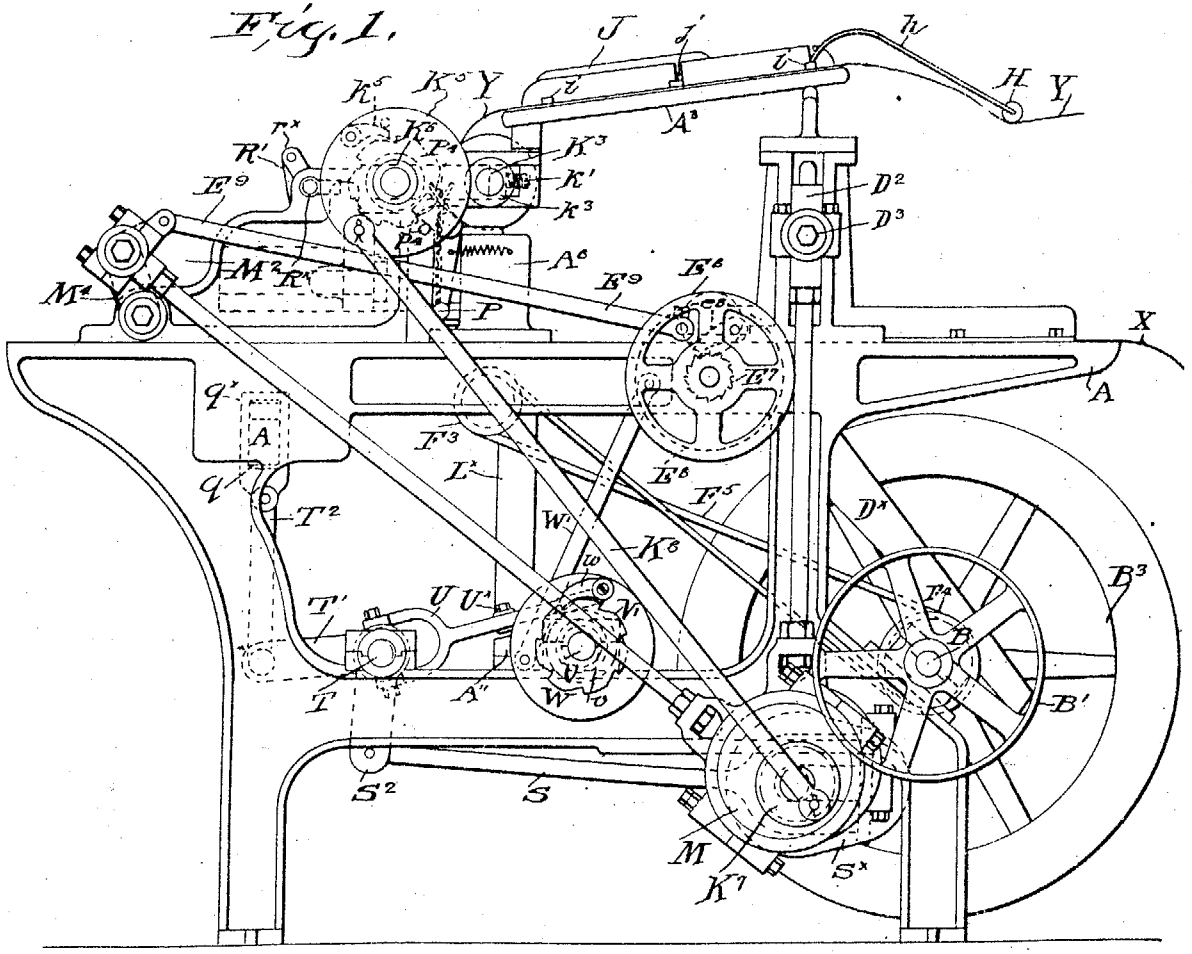

BEST AVAILABLE COPY

No. 12,591. REISSUED JAN. 8, 1907.

G. W. SWIFT, Jr.

CELL CASE MACHINE.

APPLICATION FILED JULY 14, 1906.

11 SHEETS—SHEET 1.

Witnesses

W. H. Christman

Chas. D. Welch

George W. Swift Jr. Inventor

By Staley & Bowman

His Attorneys

BEST AVAILABLE COPY

No. 12,591.

REISSUED JAN. 8, 1907

G. W. SWIFT, JR.

CELL CASE MACHINE.

APPLICATION FILED JULY 14, 1906.

11 SHEETS—SHEET 2

Witnesses

W. H. Christman

Chas. J. Milch

Inventor

George W. Swift Jr.

By Staley Bowman

Their Attorneys

BEST AVAILABLE COPY

No. 12,591. REISSUED JAN. 8, 1907.

G. W. SWIFT, Jr.

CELL CASE MACHINE.

APPLICATION FILED JULY 14, 1906.

11 SHEETS—SHEET 3.

Inventor

George W. Swift Jr.

Witnesses

C. H. Christman

Chas. S. Mott

By

Staley & Bonner

Attorneys

BEST AVAILABLE COPY
No. 12,591. REISSUED JAN. 8, 1907.
G. W. SWIFT, Jr.
CELL CASE MACHINE.
APPLICATION FILED JULY 14, 1906.
11 SHEETS—SHEET 4.
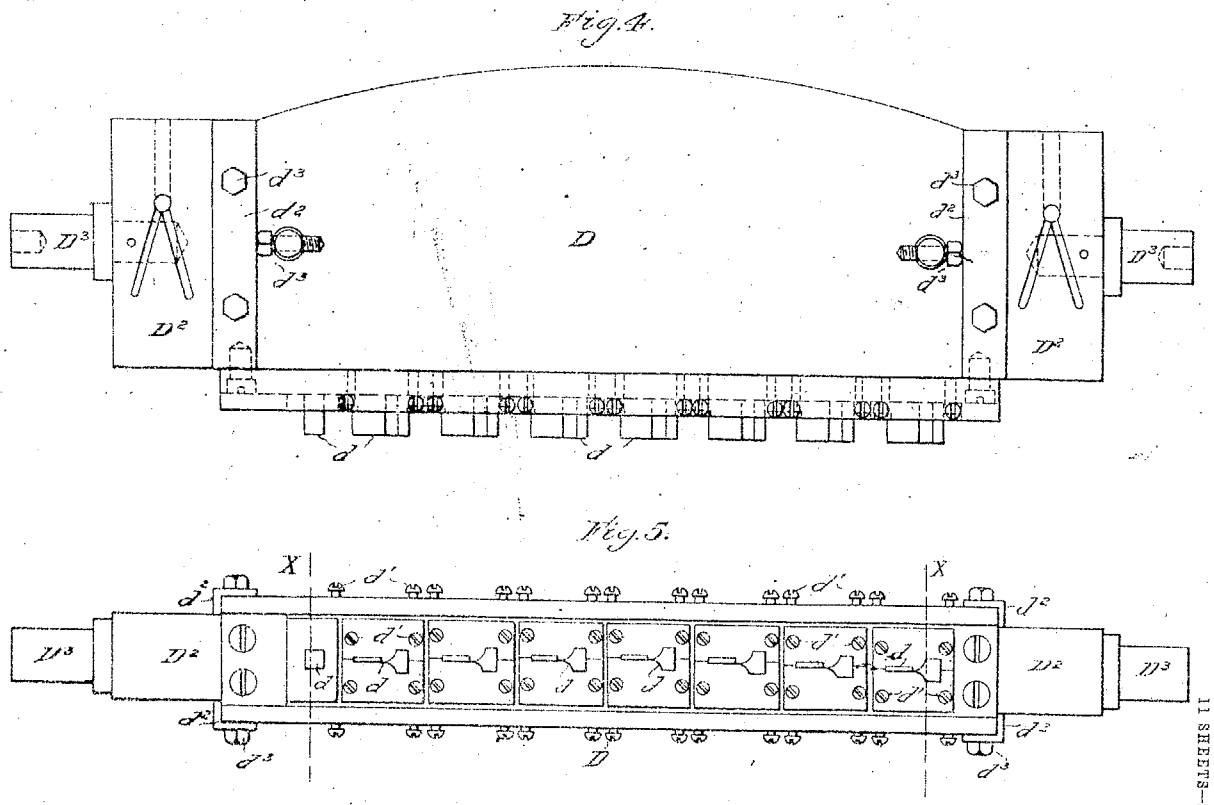
WITNESSES:
W. H. Christman
Chas. F. Wilch
INVENTOR
George W. Swift Jr.
BY
Staby & Bowman
ATTORNEYS

BEST AVAILABLE COPY

No. 12,591. REISSUED JAN. 8, 1907.

G. W. SWIFT, Jr.

CELL CASE MACHINE.

APPLICATION FILED JULY 14, 1906.

11 SHEETS—SHEET 5.

Witnesses

Chas. J. Mohr

W. H. Christman.

Inventor

George W. Swift Jr.

By

Staley Bowman

His Attorneys

BEST AVAILABLE COPY
No. 12,591. REISSUED JAN. 8, 1907.
G. W. SWIFT, JR.
CELL CASE MACHINE.
APPLICATION FILED JULY 14, 1906.
11 SHEETS—SHEET 6.
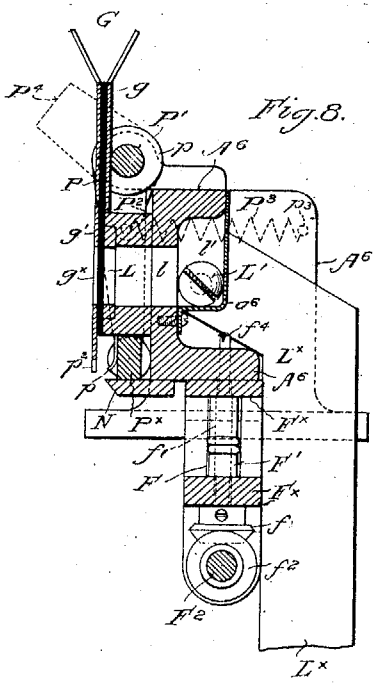
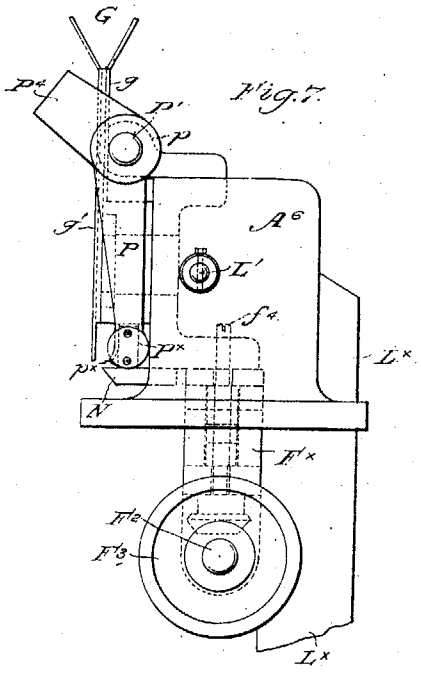
WITNESSES:
W. H. Christman
Chas. J. Milch
George W. Swift Jr. INVENTOR.
BY
Staley & Bowman
ATTORNEYS.

BEST AVAILABLE COPY

No. 12,591. REISSUED JAN. 8, 1907.

G. W. SWIFT, JR.

CELL CASE MACHINE.

APPLICATION FILED JULY 14, 1906.

11 SHEETS—SHEET 7.

WITNESSES:

W. H. Christman.

Chas. J. Mich

INVENTOR.

George W. Swift Jr.

BY

Staley & Bonnan

ATTORNEYS

BEST AVAILABLE COPY

No. 12,591. REISSUED JAN. 8, 1907.

G. W. SWIFT, JR.

CELL CASE MACHINE.

APPLICATION FILED JULY 14, 1906.

11 SHEETS—SHEET 8.

Inventor

George W. Swift Jr.

Witnesses

W. H. Christman

Chas. J. Wlob

By Staley & Bonman

His Attorneys

BEST AVAILABLE COPY

No. 12,591. REISSUED JAN. 8, 1907.

G. W. SWIFT, JR.

CELL CASE MACHINE.

APPLICATION FILED JULY 14, 1906.

11 SHEETS—SHEET 9

Inventor

George W. Swift Jr.

Witnesses

W. H. Christman

Chas. F. Milch

By

Staley & Borman

Their Attorneys

BEST AVAILABLE COPY
No. 12,591.
REISSUED JAN. 8, 1907.
G. W. SWIFT, Jr.
CELL CASE MACHINE.
APPLICATION FILED JULY 14, 1906.
11 SHEETS—SHEET 10.
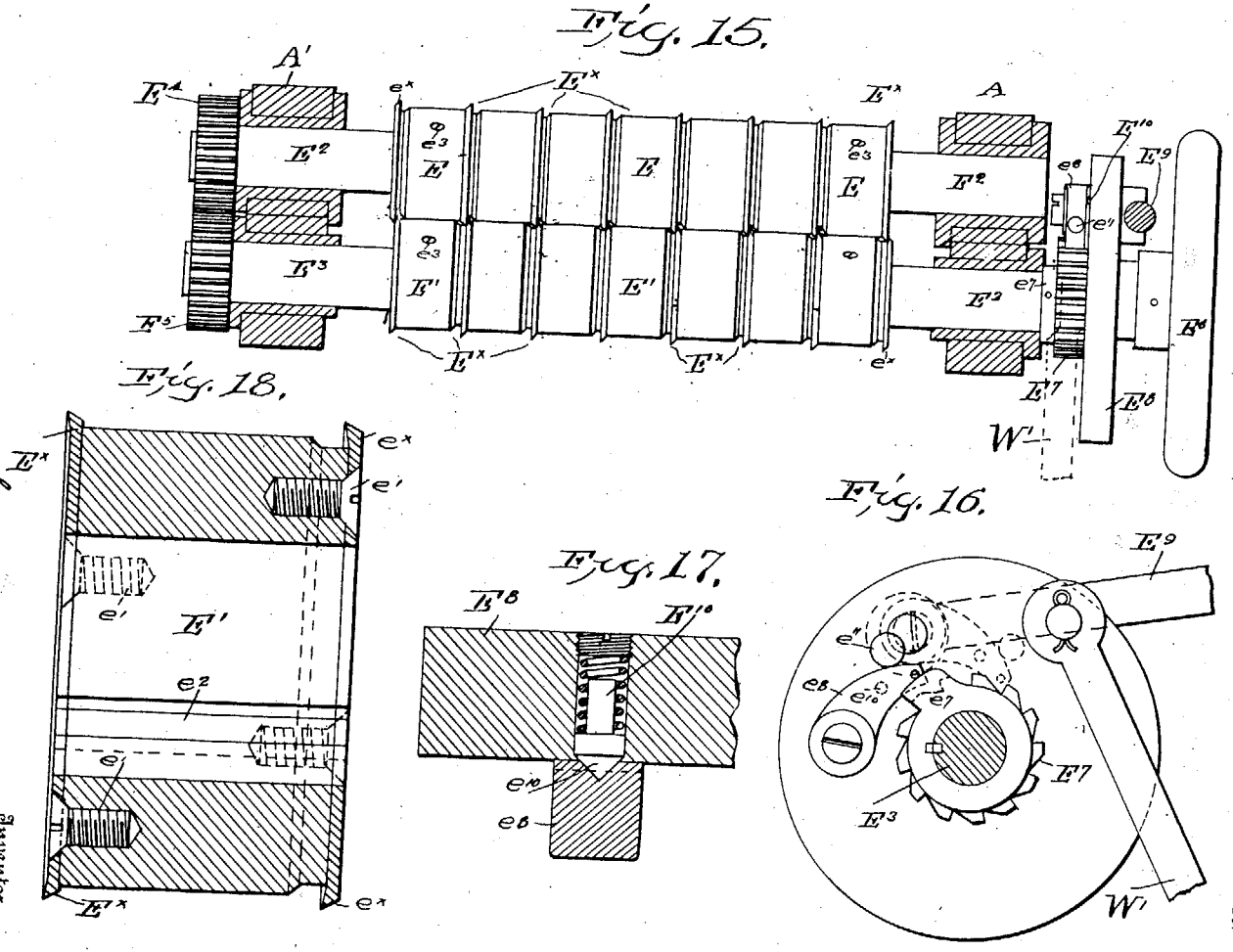
Witnesses
W. H. Christman
Chas. I. Welch
Inventor
George W. Swift Jr.
By Staley Bowman
Attorneys BEST AVAILABLE COPY
No. 12,591. REISSUED JAN. 8, 1907.
G. W. SWIFT, Jr.
CELL CASE MACHINE.
APPLICATION FILED JULY 14, 1906.
11 SHEETS—SHEET 11.
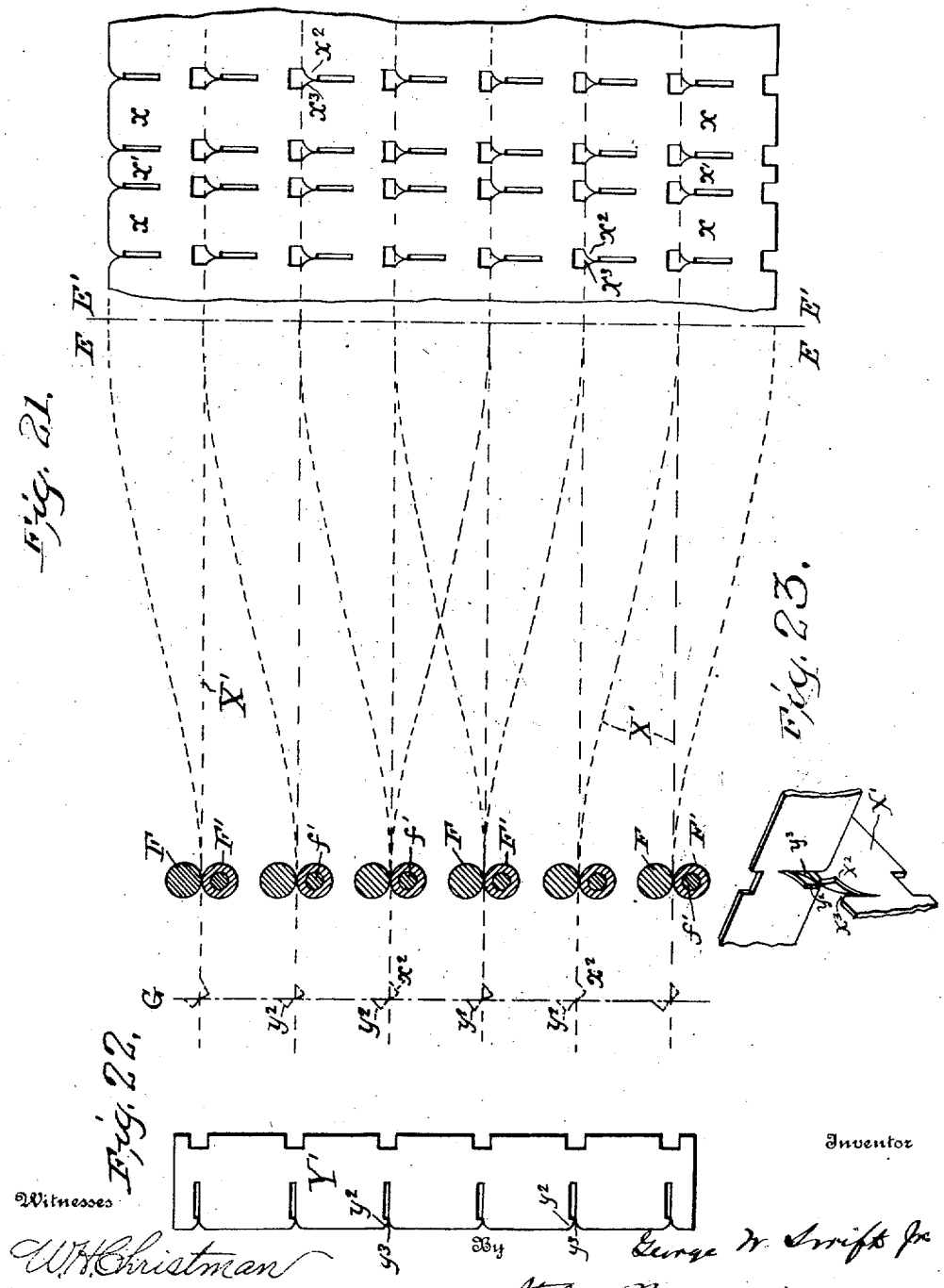
Witnesses
W. H. Christman
Chas. J. Welch
Inventor
George W. Swift Jr.
By Staley & Bowman
Attorneys.

BEST AVAILABLE COPY

UNITED STATES PATENT OFFICE.

GEORGE W. SWIFT, JR., OF BORDENTOWN, NEW JERSEY.

CELL-CASE MACHINE.

No. 12,591. Specification of Reissued Letters Patent. Reissued Jan. 8, 1907.

Original No. 622,403, dated April 4, 1899. Application for reissue filed July 14, 1906. Serial No. 326,296.

*To all whom it may concern:*

Be it known that I, GEORGE W. SWIFT, Jr., of Bordentown, in the State of New Jersey, have invented certain new and useful Improvements in the Manufacture of Cell-Cases, whereof the following is a specification, reference being had to the accompanying drawings.

My invention relates to the manufacture of cell-cases or "fillers" for crates used in the transportation of fruit, eggs, &c., one of its objects being to provide simple and efficient mechanism to automatically produce from flat paper webs a continuous fabric comprising rectangular cells, insuring the efficient assembling of same.

My invention comprises not only improvements in the construction and operation of mechanism of the class described, but also comprehends a peculiar formation of the partition-strips of the fabric aforesaid which conduces to a more efficient and rapid automatic manufacture of cell-cases by said mechanism than has hitherto been possible.

My invention comprises a machine to which are supplied separate flat webs of paper, from which are respectively formed the longitudinal and transverse partition-strips of the cell-cases, one of said webs of paper being first perforated with a series of similar slots extending transversely of said web in a curved line. Said web is then divided into a plurality of longitudinal strips, the arrangement of said slots being such as to provide each of said longitudinal strips with similar notches for engagement with the transverse strips subsequently inserted therein by the automatic action of the machine. Subsequent to said longitudinal division of the aforesaid paper web each of its strips is turned at right angles with the plane of the web by separate feed-rollers, which assemble the strips with their slots or notches in straight alinement. Said rollers feed said assembled strips to mechanism which bends the edges of said notches to insure their proper engagement with the transverse strips. The web from which the transverse strips are to be formed is passed between feed-rollers to suitable mechanism and perforated with a series of slots arranged transversely with respect to said web in a straight line. The teats formed on the edges of said slots are then bent to facilitate engagement thereof with the notches in the longitudinal strips. Said web is then fed into engagement with the longitudinal strips with the notches of which said transverse web is in registry. A strip of width equal to the longitudinal strips with which said web is engaged is then cut transversely from said web and passes thence as a portion of the cell-case fabric.

The aforesaid operation is of course repeated at intervals determined by the dimensions of the individual cells, the transverse strips being thus successively inserted in proper relation with the longitudinal strips. A continuous fabric of cell-cases is formed which is fed forward in the machine by the feeding mechanism engaged with the continuous longitudinal strips of the first-named paper web, and thus presented in proper relation with shearing mechanism which separate said fabric into blocks or fillers containing a predetermined number of cells. Said shearing mechanism comprises opposed blades each provided with knife-edged notches equal in number to the said longitudinal strips in the cell-case fabric, said blades being reciprocated at predetermined intervals, so that the respective notches of said blades engage with the respective longitudinal strips of said fabric. Said blades are relatively shifted when in proper relation with said strips, so as to simultaneously sever said strips, and thus form the separate blocks of cells or fillers, as aforesaid. During the engagement of the shearing mechanism with the fabric the latter is held in proper relation therewith by means of mechanism which also insures that the transverse strips are seated in proper relation with the longitudinal strips.

Figure 2:
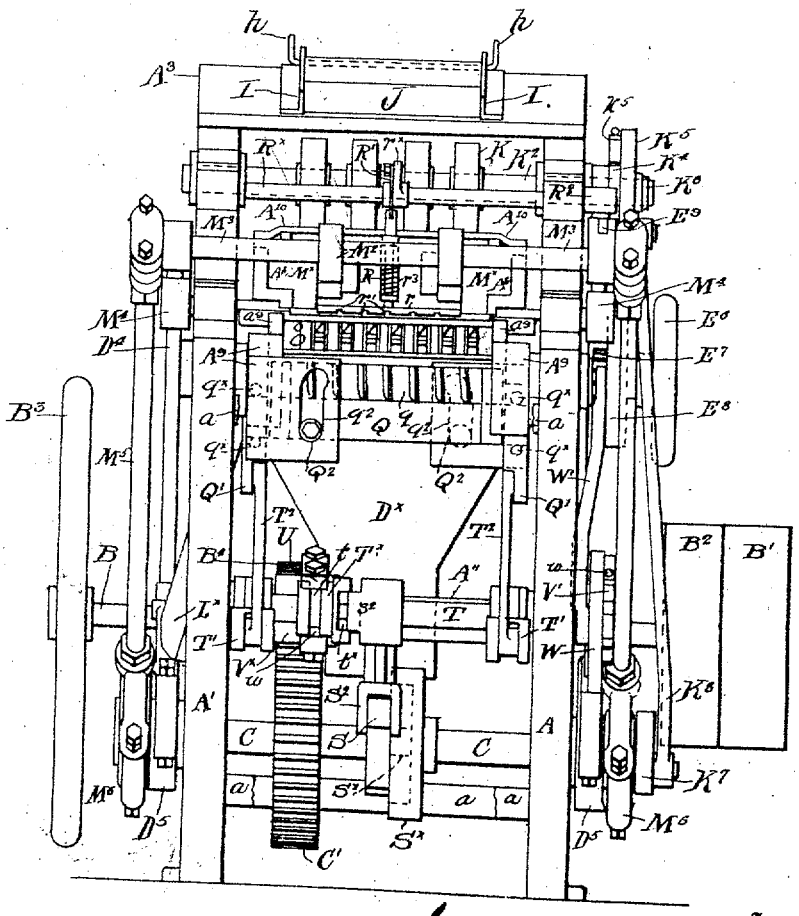
Figure 3:
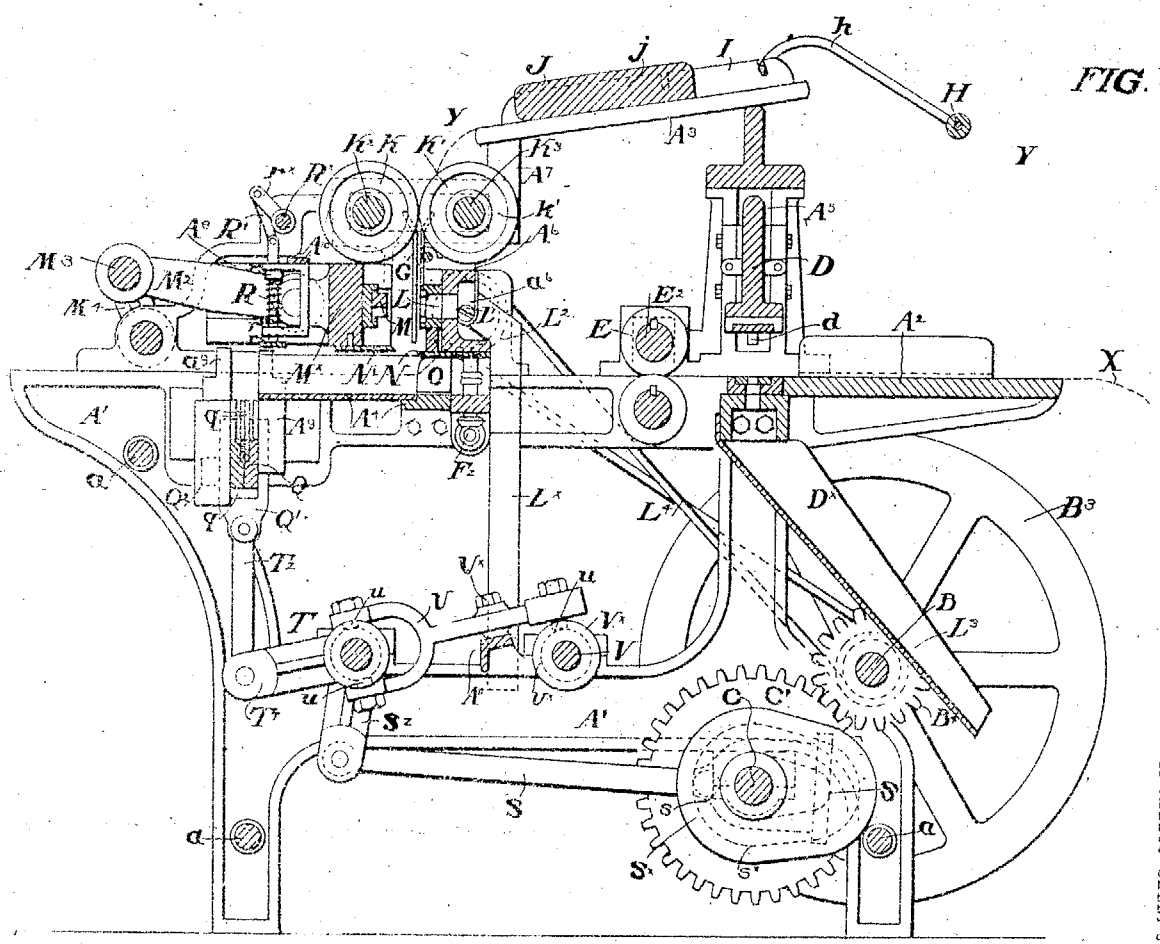
Figure 6:
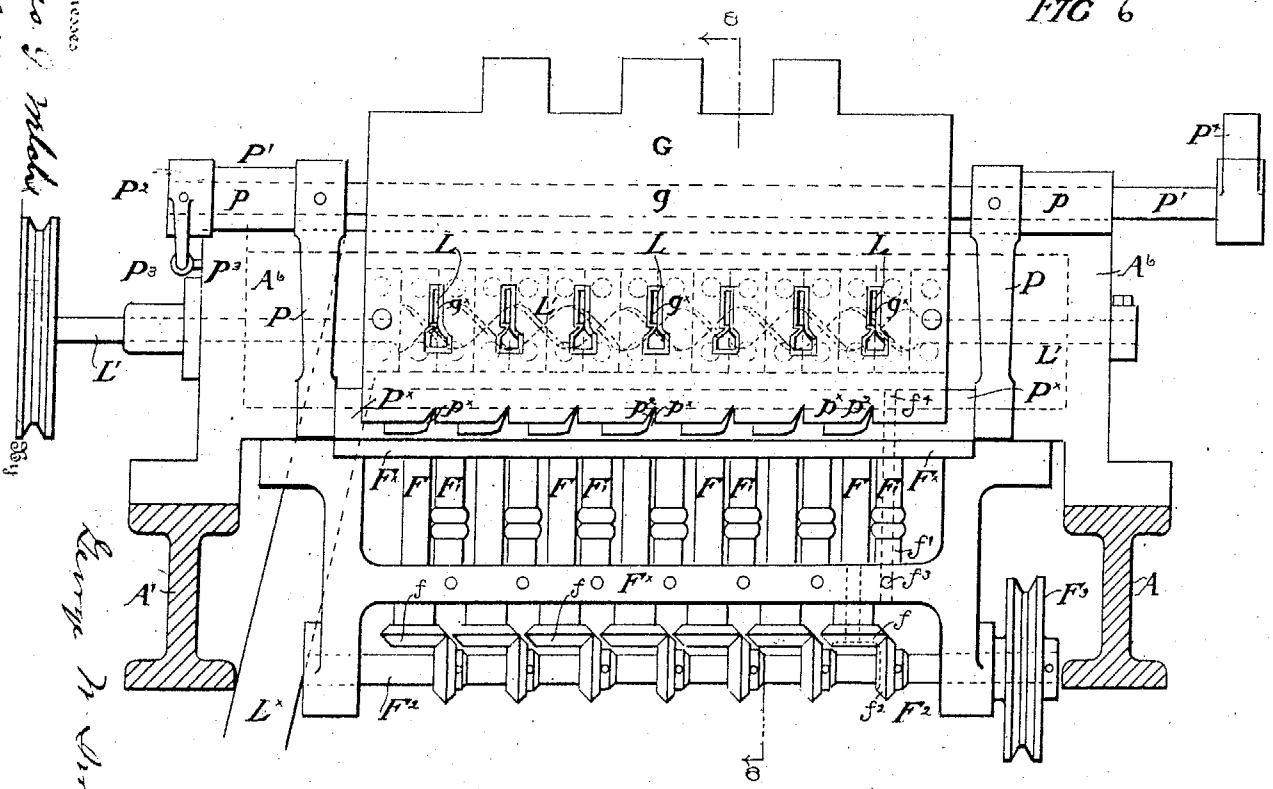

In the drawings, Figure 1 is a side elevation of a machine embodying my invention. Fig. 2 is a rear elevation of said machine. Fig. 3 is a central longitudinal sectional view on the line 3 3 of Fig. 2. Fig. 4 is a front elevation of the vertical reciprocating cross-head carrying the dies to perforate the paper web which ultimately forms the longitudinal strips of the cell-case. Fig. 5 is an inverted plan view of said cross-head, showing the arrangement of the respective dies substantially in the arc of a circle transversely to the direction of travel of the paper web. Fig. 6 is a rear elevation of the transverse frame member supporting the conduit for the paper web which ultimately forms the transverse strips, the female dies for perforating

Figure 10:
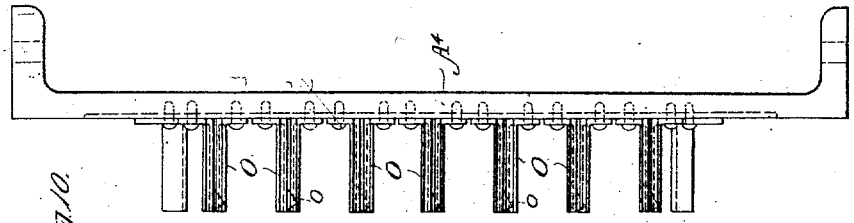
Figure 9:
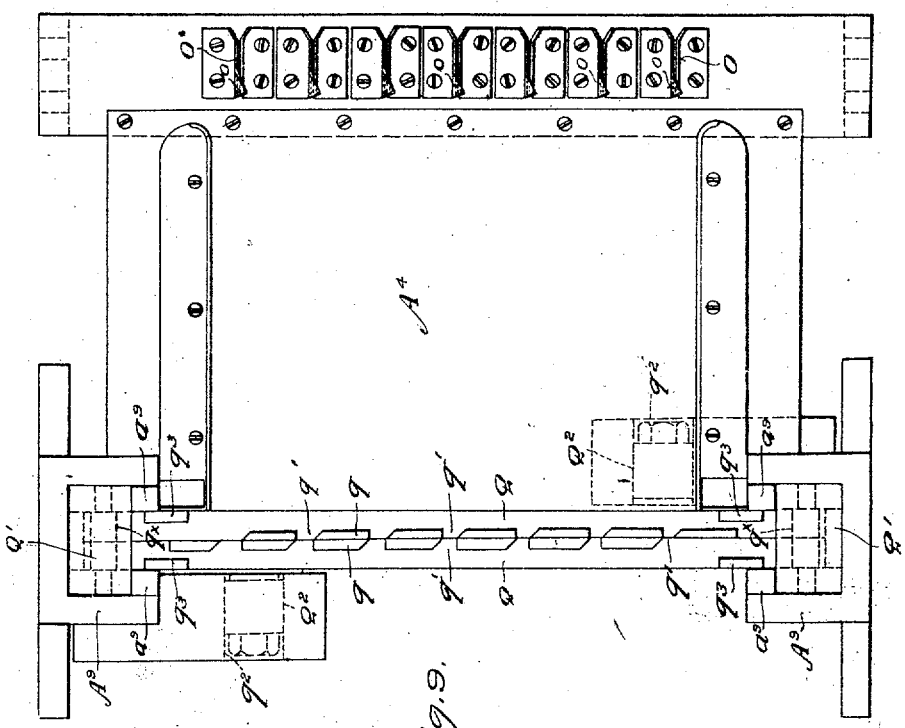
Figure 12:
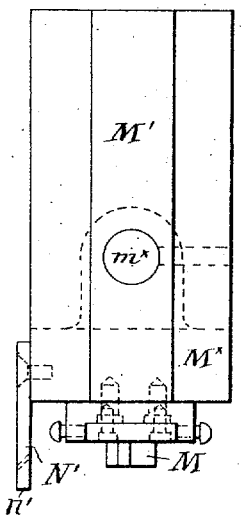
Figure 11:
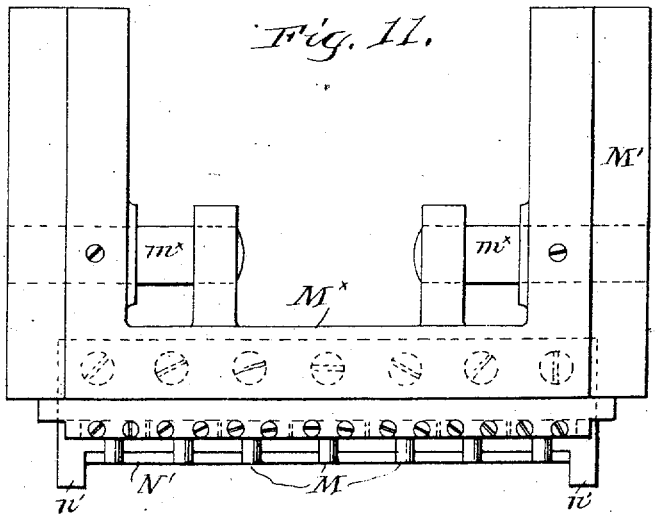
Figure 13:
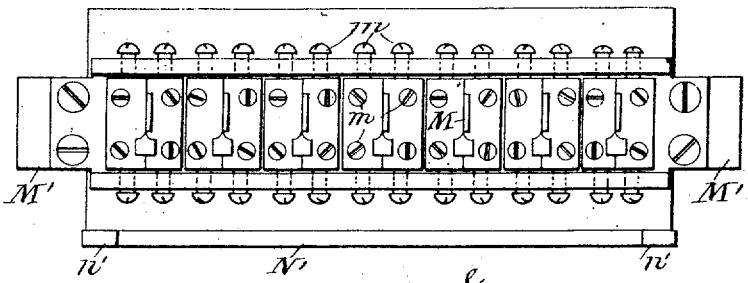
Figure 14:
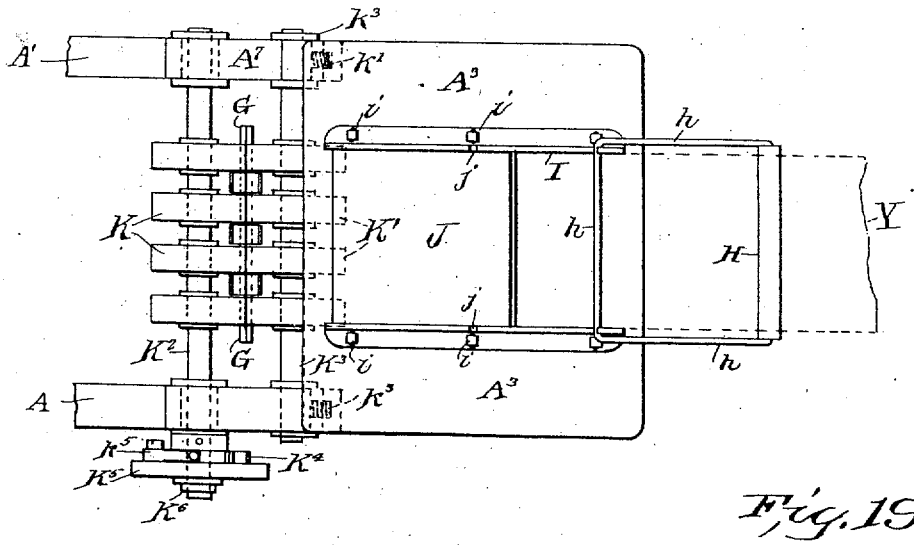
Figure 19:
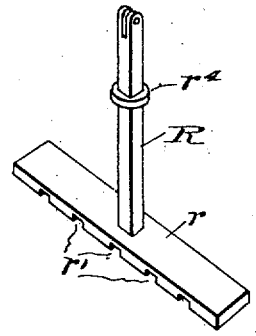
Figure 20:
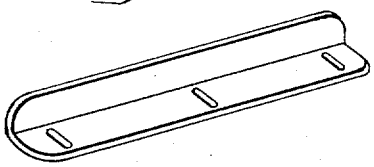
Figure 24:
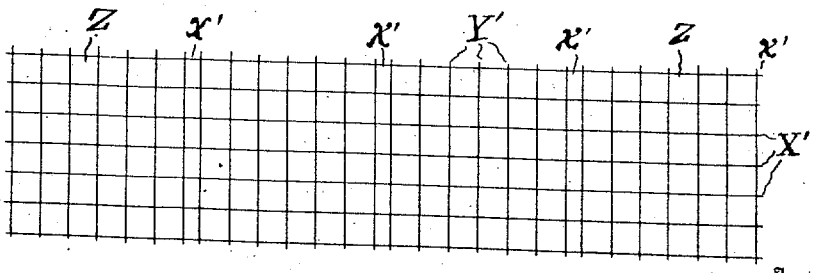

BEST AVAILABLE COPY said web, and the individual pairs of vertical feed-rollers for the respective longitudinal strips, their driving mechanism, &c. Fig. 7 is an elevational view of the right-hand end of Fig. 6. Fig. 8 is a sectional view on the line 8 8 of Fig. 6. Fig. 9 is a plan view of the table to support the finished cell-case fabric, showing the matrices to effect the flexing of the edges of the notches in the longitudinal strips, shearing mechanism, &c. Fig. 10 is a front elevation of the frame member supporting said table and said matrices. Fig. 11 is a plan view of the cross-head carrying the male dies adapted to coöperate with the dies shown in Figs. 6, 7, &c. Fig. 12 is a side elevation of said cross-head. Fig. 13 is a front elevation of said cross-head, showing the respective dies in position thereon. Fig. 14 is a partial plan view of the machine. Fig. 15 is a transverse sectional view of the machine, showing the combination feed and slitting rollers for the longitudinal paper web. Fig. 16 is an inside face view of the pawl-disk shown in side elevation in Fig. 15. Fig. 17 is a fragmentary sectional view showing the detent for maintaining the actuating-pawl in idle position. Fig. 18 is an enlarged sectional view of one of the feed-rollers shown in side elevation in Fig. 15. Fig. 19 is a perspective view of the impinging plunger for seating the partition-strips in proper relation. Fig. 20 is a perspective view of one of the adjustable side guides for the paper web. Fig. 21 is a plan view of the paper web, showing the method of assembling its longitudinal strips. Fig. 22 is a side elevation of one of the transverse strips. Fig. 23 is a fragmentary perspective view showing the relative position of the flexed portions of the respective transverse and longitudinal strips prior to their interengagement. Fig. 24 is a plan view of a portion of the cell-case fabric.

In said figures, A A′ are the side frames of the machine, connected by stay-rods $a$.

$A^2$ is a table at the front of the machine serving to support the paper web X, which ultimately forms the longitudinal strips in the cell-case fabric Z. $A^3$ is a table which supports the paper web Y, which ultimately forms the transverse strips in the cell-case fabric Z. $A^4$ is the table which supports the cell-case fabric. Each of said tables is fixed with respect to the side frames A A′, as aforesaid.

B is the main driving-shaft, provided with tight and loose pulleys B′ and $B^2$, respectively, and a fly-wheel $B^3$. The gear-wheel $B^4$, which is fixed upon said shaft B, serves to connect the latter with the cam-shaft C by engagement with the gear-wheel C′, fixedly mounted thereon. The cams upon said shaft serve to operate various devices comprised in the machine; but I shall first describe the punching-dies, which effect the initial operation of perforating the paper web X in the manner shown in Fig. 21. It may be seen by reference to said Fig. 21 that each row of perforations extending transversely of the web X is arranged in a curved line. A single row of said perforations is made at each stroke of the die cross-head D. (Shown in section in Fig. 3 and in detail in Figs. 4 and 5.) Said cross-head is provided with individual male dies $d$, conveniently secured therein by screws $d'$. Said dies register with corresponding female dies, which are similarly secured in the cross-bar D′, extending between the side frames A A′ in fixed relation therewith. A chute $D^x$ is conveniently disposed in fixed relation with said cross-bar to deliver the waste paper from beneath the latter exterior to the machine. The plane-faced extremities $D^2$ $D^2$ of said cross-head D are adapted for longitudinal reciprocation in the frame-slideways $A^5$, said cross-head being suitably adjusted therein by means of the cheek-pieces $d^2$, screws $d^3$, &c. Said cross-head is provided at each extremity with a cylindrical extension $D^3$, upon which are journaled the rods $D^4$, which connect the cross-head D with the eccentrics $D^5$, mounted upon the cam-shaft C. The rotation of said shaft of course serves to reciprocate said cross-head to effect said punching action of the dies above described.

The paper web X is fed forward upon the table $A^2$ beneath the cross-head D by means of the opposed rollers E E′, respectively mounted upon the shafts $E^2$ $E^3$. As shown in Fig. 15, each of said rollers is provided with a shearing or slitting blade $E^x$. Said rollers being placed *seriatim* upon their respective shafts are oppositely disposed in the two series, so as to adapt them for coöperative shearing action. The upper left-hand roller E and the lower right-hand roller E′ are each provided with an extra shearing-blade $e^x$ to properly coöperate with the shearing-blade $E^x$ opposed thereto.

Fig. 18 is a central vertical section of the aforesaid end roller E′, showing the attachment of the respective shearing-blades $E^x$ and $e^x$ thereon by means of countersunk screws $e'$. Such a construction is of obvious advantage in facilitating the restoration of worn shearing-blades, each of the rollers aforesaid being relatively fixed upon its respective shaft by means of its key-seat $e^2$ and prevented from lateral movement by set-screws $e^3$. Said shafts $E^2$ and $E^3$ are respectively provided with intermeshed gears $E^4$ and $E^5$ to insure their simultaneous rotation. It is obvious that the extent of the rotary movement of said rollers which occurs between the operative strokes of the cross-head D determines the longitudinal distance between the perforations of the web X.

The machine which I have shown is pro-

BEST AVAILABLE COPY vided with seven pairs of rollers E E′ and is therefore adapted to divide the web X into seven strips to form the cell-case fabric Z, which is six cells wide. It is desirable for convenient handling of the cell-case fabric to separate it into blocks or fillers six cells long, thus containing thirty-six cells. In order that said fillers may be separated from the cell-case fabric without waste, it is desirable to have a diminished interval in the feeding action between the successive series of seven equidistant rows of perforations made by the dies *d*, &c., to receive the transverse strips. Said diminished interval $x'$ may conveniently be one-half the extent of the normal intervals $x$ of said series, as shown in Figs. 21 and 24. To effect the aforesaid irregular intermittent rotation of the shafts $E^2$ and $E^3$, &c., I resort to the device best shown in Fig. 16. The hand-wheel $E^6$, fixed on the shaft $E^3$, facilitates the introduction of the paper web X between the rollers E and E′. The ratchet-wheel $E^7$, provided with thirteen equally-spaced teeth, is also fixed upon said shaft, and the pawl-disk $E^8$ is loosely mounted thereon between said hand-wheel $E^6$ and said ratchet $E^7$. Oscillatory motion is imparted to said pawl-disk by means of the rod $E^9$, which connects said disk with the rocker-arm $M^4$, hereinafter described. The throw of said arm $M^4$ and the consequent movement of said disk E is such as to normally rotate the shaft $E^3$ the extent of two teeth at each reciprocation; but the cam $e^7$, mounted upon the shaft $E^3$ in fixed relation with the ratchet-wheel $E^7$, serves to lift the pawl $e^8$ after six normal strokes, the relation of the parts being such as to cause said pawl to rotate said shaft the extent of but one tooth instead of the normal extent of two teeth.

In Fig. 16 the pawl $e^8$ is shown in position upon the cam $e^7$, the forward position of said pawl being indicated by the dotted lines in said figure. It is obvious that said cam prevents the seating of the pawl in engagement with the proximal tooth of the ratchet, causing it to ride over said tooth and engage with the next in the manner indicated, thus diminishing the feeding stroke, as aforesaid.

In the initial manipulation of the machine to insert the paper web, &c., it is desirable to place said pawl $e^8$ in idle position, so as to leave the shaft $E^3$ free for rotation by means of the hand-wheel $E^6$. I have therefore provided means to secure said pawl in such position at the will of the operator. As illustrated in Fig. 17, the disk $E^8$ is provided with a conical-headed spring-detent $E^{10}$, adapted for engagement with a socket $e^{10}$ in the side of the pawl $e^8$. The weight $e^{11}$ upon the extremity of said pawl $e^8$ is conveniently knob-shaped to facilitate the manipulation of the latter. It is of course obvious that as said pawl is drawn outward by the operator the detent $E^{10}$ recedes until it is free to engage in the socket $e^{10}$, from which it may be withdrawn by reverse movement of the pawl by the operator.

As shown in Fig. 21, the seven longitudinal strips X′ extend from the rolls E E′ (indicated by a dot-and-dash line in said figure) in twisted form to the seven pairs of vertical feed-rollers F F′, which assemble said strips in position to receive the transverse strips Y′.

The extent of the respective strips from one set of rolls to the other differs in accordance with their convergence toward the central strip. Therefore if the perforations in said web extended transversely thereof in a straight line it is obvious that by reason of their convergence aforesaid the notches or perforations in the outer strips would fall behind a straight line extended transversely through the notches of the center strip at or beyond the line of the vertical feeding-rollers, so that it would be impossible to insert the transverse strips in a straight line in the seven longitudinal strips. The perforations of said web X are therefore arranged, as shown in Fig. 21, substantially in the arc of a circle, so that the perforations in the outer strips are a sufficient distance in advance of the perforations in the center strips to present in straight transverse registry when converged as aforesaid. The detailed construction of said feed-rollers F and F′ is best shown in Figs. 6, 7, and 8, wherein it appears that all of the feed-rollers F are provided with beveled pinions *f* upon their lower extremities, being mounted for rotation in the housing $F^{\times}$, which also serves to support the horizontal driving-shaft $F^2$, upon which are fixed the beveled pinions $f^2$, in mesh with the pinions *f*. The shaft $F^2$ is provided with a band-wheel $F^3$, connected with a similar band-wheel $F^4$ upon the main shaft B by the belt $F^5$.

The feed-rollers F′ are mounted for idle rotation upon the shafts $f'$. In order that said rollers may be adjusted in accordance with the thickness of paper operated upon, said shafts F′ are provided with eccentrically-disposed cylindric ends, entered in suitable bearings in the housing $F^{\times}$ and secured therein by set-screws $f^3$. It is obvious that said rollers F′ may be caused to approach or recede from the rollers F in accordance with the rotative adjustment of their fixed shafts $f'$. To facilitate said adjustment, the upper extremities $f^4$ of said shafts $f'$ are slotted to receive a screw-driver and extend through the horizontal web of the transverse frame member $A^5$, which serves to support the housing $F^{\times}$. The frame member [illegible] also serves to support the conduit G, (located by the dot-and-dash line G in Fig. 21,) through which the transverse strips are in-

BEST AVAILABLE COPY serted. In that sense the conduit is fixed, though, as will be seen, part of one wall is movable. Before describing said operation and the means by which it is effected I will describe the operations which are preliminary thereto in the formation of the transverse strips Y′ from the paper web Y.

The web Y passes under the roller H, as shown in Figs. 1, 3, and 14, the roll from which said web is unwound being arranged with respect to the machine so that the convex side thereof is presented uppermost to said roller, which tends to remove its normal curl. Said roller is suspended in the yoke $h$ from bearings in the opposed guide-flanges I. The flanges I are adjustable by means of the slots and bolts indicated at $i$ in Figs. 1 and 14, serving to direct the passage of the paper web Y across the table $A^3$ in proper relation with the conduit G.

I prefer to use a presser-block J in conjunction with the roller H. Said block has a plane lower face and is free for vertical and rotative movement upon the gudgeons $j$, mounted in the side guides I. Said roller H and block J serve to render the paper web Y substantially flat before its introduction to the conduit G. It is obvious that the paper web X may be similarly treated before its introduction to the forming mechanism hereinbefore described; but it is of particular advantage to so treat the paper web Y to facilitate its automatic management, as hereinafter described.

The web Y is fed from the table $A^3$ through the conduit G by means of opposed rollers K K′, mounted, respectively, upon the shafts $K^2$ $K^3$. The shaft $K^3$ is mounted in boxes $k^3$ in the side frames A A′, respectively, being adapted for adjustment toward and from the shaft $K^2$ in slideways $A^7$ and being provided in the respective side frames with springs $k'$, which cause the rollers K′ to impinge upon the web Y, inserted between said rollers and the rollers K, the latter being positively driven, as follows:

The shaft $K^2$ is provided with a ratchet-wheel $K^4$, fixed thereon. The pawl-disk $K^5$ is loosely mounted upon said shaft $K^2$ between said ratchet-wheel $K^4$ and the fixed collar $K^6$, the parts being so related that the pawl $k^5$, pivoted upon said disk $K^5$, is adapted to engage the teeth of said ratchet-wheel $K^4$ and rotate the shaft $K^2$ the extent of one tooth at each reciprocation, thus intermittently feeding the paper web Y vertically downward in the conduit G. Said pawl-disk $K^5$ derives its motion of reciprocation from the wrist-plate $K^7$ upon the shaft C, being connected therewith by the rod $K^8$. (Shown in Figs. 1 and 2.)

Referring now to Figs. 6, 7, and 8, the front wall $g$ of the conduit G for the web Y is flush with the rear face of the series of female punching-dies L, the latter being fixed upon the transverse frame member $A^6$. Suitable apertures $l$ are formed in said frame member in registry with the openings in said dies, and a chamber $l'$ is formed toward the front of the machine behind said dies by means of the casing $a^5$, wherein the waste paper punched from said web Y is received. Said chamber communicates with a chute $L^\times$, as shown at the left-hand side of Fig. 6, the latter serving to deliver the waste paper from said dies exterior to the machine. Said waste is discharged from the chamber $l'$ by rotation of the spiral shaft L′, which is mounted for rotation in the frame member $A^6$ and provided with a band-wheel $L^2$ upon its cylindrical extremity. Rotary movement is communicated to the band-wheel $L^2$ from a similar band-wheel $L^3$ upon the shaft B by means of the belt $L^4$. (Best shown in Fig. 3.)

The male dies M, which coöperate with the dies L aforesaid to perforate the paper web Y, are mounted upon the cross-head $M^\times$ and conveniently secured therein by screws $m$, the plane-faced extremities M′ M′ of said cross-head being mounted for longitudinal reciprocation in the frame-slideways $A^8$. Said cross-head is provided with cylindrical studs $m^\times$, upon which are journaled the links $M^2$, which are at their other extremities loosely mounted upon the transverse shaft member $M^3$, which rigidly connects the rocker-arms $M^4$, the latter being mounted for oscillation in the respective side frames A A′. The member $M^3$ extends through said rocker-arms to receive the extremities of the rods $M^5$ $M^5$, reciprocated by the respective eccentrics $M^6$, mounted upon the shaft C.

Suitable apertures $g^\times$ are provided in the rear wall $g'$ of the conduit G to permit the operation of the punching-dies M aforesaid, which perforate the web Y in the manner indicated in Fig. 22.

The feeding action of the rollers K K′ occurs in advance of the punching action of the dies M L, so that the forward edge of the web Y, which has the configuration indicated at the left hand of Fig. 21, is thrust downward into engagement with the seven longitudinal strips of the paper web X, and simultaneously with the punching action aforesaid a transverse strip of the fabric Y is severed from it by the shearing action of the blade N′, which is fixedly mounted upon the cross-head $M^\times$. Said blade coöperates with the ledger-blade N, fixed upon the frame member $A^6$. To insure proper coöperation of said two blades, the blade N′ has a slightly-downward set and is provided at its forward edge with lateral projections $n'$, rounded upon their lower corners, so as to ride over the blade N and insure the proper alinement of the blade N′ therewith.

BEST AVAILABLE COPY

Owing to the peculiar interlocking form of my improved filler-strips, it is necessary for their proper engagement that they should be prepared by opening the respective notches which are to be engaged before said engagement is effected. This preparatory opening of the notched edges is best shown in Fig. 23 and is effected as follows: As shown in Figs. 3, 9, and 10, the table $A^4$ is provided with a series of matrices O, which present in the path of travel of the seven strips of the paper web X immediately adjoining the vertical rollers F F′. Said matrices comprise opposed sheet-metal plates the upper rear corners of which are bent, as indicated at $o$ in in Fig. 9, so that as said strips lie therein the edges $x^2$ of the notches $x^3$ of the respective strips X′ are bent in the position indicated in Fig. 23, said notches $X^3$ being thus opened to receive the notched edge of the paper web Y. The edges $y^2$ of the notches $y^3$ in respective strips Y′ of the latter are flexed, as shown in said Fig. 23, by means of the frame P, which is mounted for oscillation upon its upper shaft member P′ in the bearings $p$ upon the frame member $A^6$. The lower bar $P^\times$ of said frame is provided with forming-plates $p^\times$, adapted to bend the teats formed on the edges $y^2$ of said notches $y^3$ over the corners $p^2$ of the rear wall $g'$ of the conduit G, and thus open said notches $y^3$ for engagement with the notched strips X′. The said lower bar $P^\times$ in its advanced position forms a continuation of the front wall $g$ of the conduit G and in that sense is a part of said conduit, and said bar is also supported by the stationary frame $A^6$. (See Fig. 23.)

The bending action of the frame P occurs upon the withdrawal of the male dies M, as shown in Figs. 1 and 2, the normal position being that shown in Figs. 7 and 8. The action of the oscillatory frame P, supporting the lower bar $P^\times$, effects the rebending of the edge of the transverse web of strips at the point where the notches occur, thereby reforming or straightening the web at that point. It is apparent from Figs. 6, 7, and 8 that the movable blade on the movable die tends to bend the notched edges out of proper alinement to a position over the stationary blade N. The oscillatory frame P in the sequence of operations immediately acts to bend the notched edges into proper position. In thus bending the edges of the web of transverse strips the edges of the notches will be bent against the wall of the fixed conduit thereby placing the notched edges of the web in proper position for the next feeding operation. From the position of the parts shown in said figures the oscillatory frame must operate in the manner described, and this is desirable because the edges of the notches form flaps, as indicated in Fig. 22, and these flaps on the edge of the web of transverse strips are easily bent out of proper feeding position. If allowed to remain out of proper position, the movement of the web at the next feeding operation will be arrested by the edge of the web contacting against the stationary blade. The oscillatory former overcomes this difficulty by bending the edges of the notches against the wall of the fixed conduit prior to the feeding operation, so that the web will necessarily be in proper alinement before the feeding operation begins. This bending operation of the frame P occurs simultaneously with the bending of the teats on the edges of the notches over the corners formed on the fixed wall of the conduit, which is called the flexing of the notches or perforations. The shaft P′, in fixed relation with which the frame P oscillates, is provided, as shown at the right side of Fig. 6, with a lever-arm $P^4$ in position to be rocked by the stud $p^4$, fixed upon the pawl-disk $K^5$. The opposite end of said shaft P′ is provided with a lever-arm $P^2$, the spring $P^3$, connective of said arm, and the fixed pin $p^3$, serving to return said oscillating frame P to normal position.

The various devices above described serve to complete the cell-case fabric Z in the form shown in Fig. 24. It is obvious that as thus formed said fabric may be discharged from the machine and its subdivision be subsequently effected by separate mechanism. I prefer, however, to provide mechanism which coöperates in proper time with the other devices described to shear said fabric intermediate of the diminished intervals between the series of notches in the longitudinal strips before its discharge from the machine, as follows:

Referring to Figs. 1, 2, 3, and 9, Q Q are two shearing-bars, each provided with a shearing-blade $q$. Each of said blades is provided with seven knife-edged notches $q'$, slightly inclined to the perpendicular in reverse direction in the respective blades. As indicated in Fig. 3, said shear-bars Q are mounted together in yokes Q′, being adapted for endwise movement therein upon rollers $q^\times$, said yokes Q′ being mounted for vertical reciprocation in slideways $A^9$ upon the respective side frames A A′. Each of said shear-bars Q is provided with a roller $Q^2$, adapted to respectively engage in the cam-slots $q^2$, formed in fixed relation with said slideways $A^9$. As shown in Fig. 2, the configuration of said slots $q^2$ is such as to respectively and oppositely shift said two shearing-bars Q transversely of the fabric Z at the extremity of the upward stroke of the yokes Q′, causing the respective knife-edges of the notches $q'$ to overlap. Said notches $q'$ being in line with the respective longitudinal strips, it is obvious that the operation just described serves to sever said strips.

In order to insure the proper coöperation of the knife-edged notches in the respective blades the latter are pressed into intimate contact by means of the spring extensions $q^3$ upon the bars Q, which normally have a slightly outward set at their upper extremities and bear against the parallel side pieces $a^9$ of the slideways $A^8$.

As aforesaid, the shearing operation is so timed with respect to the other operations of the machine that the above-described lifting of the yokes Q′ and consequent shifting of the shear-bars Q occur when the diminished intervals in the fabric Z are in registry with said shearing-blades $q$, said yokes being vertically reciprocated, as hereinafter described.

As shown in Figs. 1, 2, and 3, the plunger R is mounted for vertical reciprocation in the transverse frame member $A^{10}$, which is supported at opposite sides of the machine upon the respective slideways $A^8$. Said plunger R is connected by a link R′ with an arm $r^{\times}$, fixedly secured upon the shaft $R^{\times}$. The arm $R^2$, fixedly mounted upon the extremity of said shaft $R^{\times}$, projects between the frame A, and the pawl-disk $K^5$, being encountered by the studs $r^3$ upon the latter during its operative stroke, serves to positively thrust said plunger R downward. Reverse movement of said plunger is effected upon the reverse movement of the pawl-disk $K^5$ by means of the spiral spring $r^5$, which encircles the stem of said plunger and bears at its respective ends upon the frame member $A^{10}$ and the collar $r^4$, fixed upon said stem. Said plunger reciprocates simultaneously with the cross-heads D and $M^{\times}$, &c., and is provided at its lower extremity with a plate-head $r$, adapted to impinge upon each of the transverse strips Y′ as they are successively presented beneath it by the step-by-step feeding movement of the fabric Z. Said head $r$ is grooved, as indicated at $r'$, in registry with the longitudinal strips X′, so as not to impinge upon the latter, its downward thrust upon the transverse strips Y′ insuring the proper seating of the latter in said longitudinal strips. Said plunger R not only insures the proper seating of each transverse strip in the fabric Z, but also serves to hold the fabric Z down upon the table $A^4$ during the upward stroke of the yokes Q′, and the transverse stroke of the bars Q, which occurs, as above described, at every seventh stroke of the plunger R. The cam $S^{\times}$ is fixedly mounted upon the shaft C, upon which the pitman S is mounted for reciprocation by means of its yoke S′. Said pitman S is provided with a roller $s$, entered in the camway $s^{\times}$ in said cam $S^{\times}$. The motion of reciprocation which is imparted to said pitman S by the rotation of the cam $S^{\times}$ is communicated to the rocker-arm $S^2$, which is loosely mounted upon the shaft T, the latter being suitably journaled in the side frames A A′. Said shaft T is provided with two arms T′ T′, mounted in fixed relation thereon, and said arms T′ are connected with the respective yokes Q′ by means of the links $T^2$. The sleeve $T^{\times}$, which is provided with a clutch-shaped end $t^{\times}$, opposed to a similar clutch-shaped hub $s^2$ on the arm $S^2$, is adapted for longitudinal movement with respect to said shaft T, but rotatively secured thereon. Said sleeve is provided with a circumferential groove $t$, in which are engaged the projections $u$ upon the bifurcated extremity of the lever U, the latter being fulcrumed at $U^{\times}$ upon the transverse member of the frames $A^{11}$, and the stud $u'$ at the opposite extremity of said lever being entered in the circumferential groove $v^{\times}$ of the cam $V^{\times}$, fixed upon the shaft V.

The relation of the parts just described is such that although the pitman S and loose rocker-am $S^2$ are reciprocated by rotation of the cam $S^{\times}$ in synchronism with each reciprocatory movement of the cross-heads D and $M^{\times}$, &c., said movement of reciprocation is not communicated from said arms $S^2$ to the shaft T and the yokes Q′ except at the proper intervals aforesaid by the revolution of the cam $V^{\times}$, fixed upon the shaft V. The shaft V is intermittently rotated in synchronism with the step-by-step movement of the feed-rollers E E′ by means of the link W′, which connects the pawl-driving disk $E^6$ with the similar disk W. Said disk W, being loosely mounted upon said shaft V between the collar $v$ and the ratchet-wheel V′, (both of which are fixed upon said shaft,) engages and rotates said ratchet V′ and shaft V in the manner aforesaid by means of the pawl $w$, which is pivotally mounted on said disk W. (See Fig. 1.)

In the machines of the prior art whereby cell-case fabric is formed from separate webs at a single operation said webs were both divided transversely into strips, which form the respective longitudinal and transverse strips of the cell-case fabric, and therefore said webs are of necessity fed in the machine with the transverse axis of one web in right-angular relation with the transverse axis of the other web. In considering the relation of said webs I have used the term "transverse axis" with reference to the plane of the web at right angles to its length. The machines of the prior art by reason of said relation of the webs are prolonged in two directions to receive and feed forward the respective webs. As appears from the foregoing description, it is characteristic of my invention that one of said webs is divided into longitudinal strips for interengagement with the strips into which the other web is transversely divided, so that both of said webs may be fed in the machine in the same general direction—that is to say, the transverse axes of the respective webs are in parallel relation. Such an arrangement is of obvious advantage in that my machine may be more compactly formed than the machines of the prior art, the supply of both webs being maintained upon and received from a single side of the machine.

It is obvious that various modifications may be made without departing from the spirit of my invention. I therefore do not desire to limit myself to the precise construction which I have shown and described.

The combination with the conduit of the forming-plates carried by the oscillatory former P are not claimed herein except in combination with the flexing means for the longitudinal strips.

Having thus described my invention, I claim—

1. In a cell-case machine, the combination with feeding mechanism for the longitudinal and transverse strips of the cell-case fabric, of mechanism to notch said strips, mechanism comprising a stationary matrix to flex the edges of said notches, and mechanism cooperative with said stationary matrix to interengage the flexed strips, substantially as set forth.

2. In a cell-case machine, the combination with feeding mechanism for cell-case fabric, of shearing mechanism comprising two relatively movable blades, knife-edged notches in said blades to receive the cell-walls, mechanism to shift said blades to embrace said walls, and mechanism to effect the shearing operation of said blades, substantially as set forth.

3. In a cell-case machine, the combination with feeding mechanism for the cell-case fabric, of shears for said fabric adapted to be intermittently operated in a predetermined sequence with respect to the intermittent operation of said feeding mechanism, by the following instrumentalities: a rock-shaft, an arm fixed upon said rock-shaft and linked to said shears, a second arm loosely journaled upon said rock-shaft, mechanism to oscillate said loosely-journaled arm, clutch members upon the respective opposed faces of said fixed and loose arms, and a cam to effect the interengagement of said clutch members, and the consequent operation of said shears, at predetermined intervals, substantially as set forth.

4. In a cell-case machine, the combination with feeding mechanism for the cell-case fabric, of a pair of shear-blades, yokes for the opposite extremities of said blades, means to reciprocate said yokes, means to reciprocate said blades in said yokes, to shear said fabric, substantially as set forth.

5. In a cell-case machine, the combination with feeding mechanism for the cell-case fabric, of a pair of shear-blades, yokes for the opposite extremities of said blades, slideways for said yokes, mechanism to reciprocate said yokes in said slideways, and mechanism to relatively shift said two blades to shear said fabric, substantially as set forth.

6. In a cell-case machine, the combination with feeding mechanism for the cell-case fabric, of a pair of shear-blades, yokes for the opposite extremities of said blades, slideways for said yokes, mechanism to reciprocate said yokes in said slideways, and a fixed cam to relatively shift said two blades to shear said fabric, substantially as set forth.

7. In a cell-case machine, the combination with feeding mechanism for the cell-case fabric, of a pair of shear-blades having registered knife-edged notches, yokes for the opposite extremities of said blades, slideways for said yokes, roller-bearings in said yokes for said blades, mechanism to reciprocate said yokes, and mechanism to reciprocate said blades in said yokes upon said roller-bearings, to open and close said notches, substantially as set forth.

8. In a cell-case machine, paper-web-feeding mechanism for intermittent operation comprising: opposed feeding-rollers to grip the said web, a train of driving mechanism for said rollers comprising a ratchet-wheel with equal-spaced teeth, a reciprocatory pawl for engagement with said ratchet-teeth, and an eccentric to intermittently lift said pawl from said ratchet-teeth, and thus effect a diminished interval in the feeding operation, substantially as set forth.

9. In a cell-case machine, the combination with a fixed punching-die, provided with a shear-blade, of a moving punching-die provided with a shear-blade, and overlapping fingers upon the extremities of said blades to insure their proper alinement, substantially as set forth.

10. In a cell-case machine, the combination with a series of separate paper-web-feeding rollers, each provided with a circular shearing-plate, of a terminal roller for said series provided with two circular shearing-plates, and a similar reversed series of said rollers opposed to the first series and provided with a similar terminal roller, substantially as set forth.

11. In a cell-case machine, the combination with feeding mechanism for the cell-case strips, of mechanism to notch or perforate said strips, a fixed conduit for said strips, and an oscillatory former adapted to bend the edges of the notches in said strips against the wall of said fixed conduit, substantially as set forth.

12. In a cell-case machine the combination with mechanism to feed separate paper webs, of mechanism to perforate said webs, mechanism to flex the edges of the perforations in the respective webs, mechanism to

BEST AVAILABLE COPY interengage the flexed portions of the respective webs before said portions are severed from the respective webs, and mechanism to sever said perforated portions from the respective webs subsequent to their interengagement, substantially as set forth.

13. In a cell-case machine the combination with mechanism to feed a notched paper strip, of a matrix through which said strip is fed, whereby the edges of its respective notches are flexed, said flexing operation being effected by opposed relatively fixed members of said matrix, substantially as set forth.

Signed this 8th day of June, 1906.

GEORGE W. SWIFT, JR.

Witnesses:

RICHARD C. WOODWARD,
R. H. AARONSON.